(12) United States Patent
Li et al.

(10) Patent No.: US 10,991,277 B2
(45) Date of Patent: Apr. 27, 2021

(54) FLEXIBLE DISPLAY SUBSTRATE

(71) Applicant: BOE Technology Group Co., Ltd., Beijing (CN)

(72) Inventors: Yuanyuan Li, Beijing (CN); Junjie Li, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 16/397,070

(22) Filed: Apr. 29, 2019

(65) Prior Publication Data

US 2020/0043384 A1    Feb. 6, 2020

(30) Foreign Application Priority Data

Jul. 31, 2018   (CN) .......................... 201810858556.2

(51) Int. Cl.
  *G09F 9/30* (2006.01)
  *G06F 3/041* (2006.01)

(52) U.S. Cl.
  CPC ............ *G09F 9/301* (2013.01); *G06F 3/0412* (2013.01); *G06F 2203/04102* (2013.01)

(58) Field of Classification Search
  CPC ......... H01L 2251/5338; H01L 51/0097; H01L 27/3276; H01L 23/4985; H01L 23/528; G02F 1/13452; G02F 1/133305; G06F 2203/04102; G06F 3/0412; G06F 3/041; G09F 9/301; G09G 2300/0426
  See application file for complete search history.

(56) References Cited

U.S. PATENT DOCUMENTS

| | | | |
|---|---|---|---|
| 2016/0079336 A1* | 3/2016 | Youn ................... | H01L 51/0097 257/40 |
| 2017/0256599 A1 | 9/2017 | Kim et al. | |
| 2018/0324919 A1 | 11/2018 | Wang | |
| 2019/0019441 A1* | 1/2019 | Shin ..................... | H01L 51/0031 |
| 2019/0095007 A1* | 3/2019 | Jeong .................... | G06F 1/1643 |

FOREIGN PATENT DOCUMENTS

| | | |
|---|---|---|
| CN | 205657057 U | 10/2016 |
| CN | 107025853 A | 8/2017 |
| CN | 107154416 A | 9/2017 |
| CN | 108091679 A | 5/2018 |

OTHER PUBLICATIONS

Office Action for corresponding Chinese Application 201810858556.2 dated Nov. 15, 2019.

* cited by examiner

*Primary Examiner* — Koosha Sharifi-Tafreshi
(74) *Attorney, Agent, or Firm* — Arent Fox LLP; Michael Fainberg

(57) ABSTRACT

The disclosure relates to a flexible display substrate including: a flexible base substrate, and a trace layer arranged on the flexible base substrate, wherein the trace layer includes a first trace layer and a second trace layer, an insulating layer is arranged between the first trace layer and the second trace layer, the insulating layer comprises through-holes, the first trace layer and the second trace layer are electrically connected with each other through the through-holes, the first trace layer includes a first trace, and the second trace layer includes a plurality of discrete second traces.

9 Claims, 3 Drawing Sheets

FLEXIBLE DISPLAY SUBSTRATE

CROSS-REFERENCE TO RELATED APPLICATION

This application claims priority of Chinese Patent Application No. 201810858556.2, filed on Jul. 31, 2018, which is hereby incorporated by reference in its entirety.

FIELD

The present disclosure relates to the field of display technologies, and particularly to a flexible display substrate.

BACKGROUND

As the sciences and technologies are advancing, we are asking for more from and increasingly relying on mobile terminals, and more portable display devices satisfying our ergonomic and aesthetic demands have been widely favored. A flexible display device which is advancing rapidly has become the top candidate among the display devices in that it can be folded, curved, etc., and thus can display an image in a varying form.

At present, the flexible display device with a narrow bezel can provide a watching user with a good experience, and thus has consumed a large number of consumers and is expected to be promising in the market.

SUMMARY

Some embodiments of the disclosure provide a flexible display substrate including: a flexible base substrate, and a trace layer arranged on the flexible base substrate, wherein:

the trace layer includes a first trace layer and a second trace layer, an insulating layer is arranged between the first trace layer and the second trace layer, the insulating layer includes through-holes, the first trace layer and the second trace layer are electrically connected with each other through the through-holes, the first trace layer includes a first trace, and the second trace layer includes a plurality of discrete second traces.

Optionally, a touch electrode layer is arranged on the flexible display substrate, and a part of the touch electrode layer is reused as the first trace layer.

Optionally, the insulating layer is arranged on a side of the touch electrode layer away from the flexible base substrate, the insulating layer is made of a flexible material, and a wire layer is arranged on the insulating layer as the second trace layer.

Optionally, the wire layer is a bridging conductor layer.

Optionally, the material of the wire layer is metal.

Optionally, the trace layer includes at least one of following structures: the first trace is a curved trace, and the second trace is a curved trace.

Optionally, the curved trace is a serpentine trace, or bent segments connected in sequence.

Optionally, a shape of the through-holes is at least one of a circle, a square, a diamond, or an ellipse.

Optionally, the trace is a trace with a fixed bending area.

Optionally, the trace is at least one of a scan line, a data signal line, a clock signal line, or a touch signal line.

DETAILED DESCRIPTION OF THE EMBODIMENTS

Particular implementations of the flexible display substrate, the display panel, and the display device according to embodiments of the disclosure will be described below in details with reference to the drawings.

Figure 1:
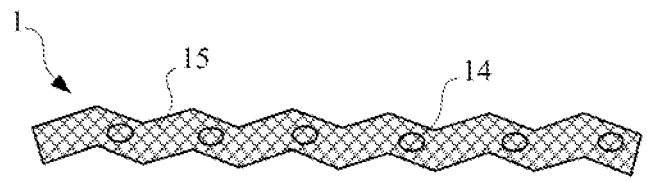
FIG. 1 is a schematic structural diagram of a trace according to some embodiments of the disclosure.
Figure 2:
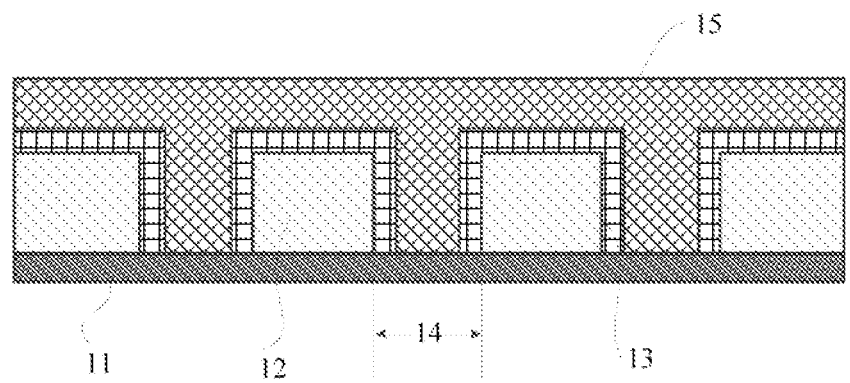
FIG. 2 is a schematic diagram of the trace according to some embodiments of the disclosure in a sectional view.
Figure 7:
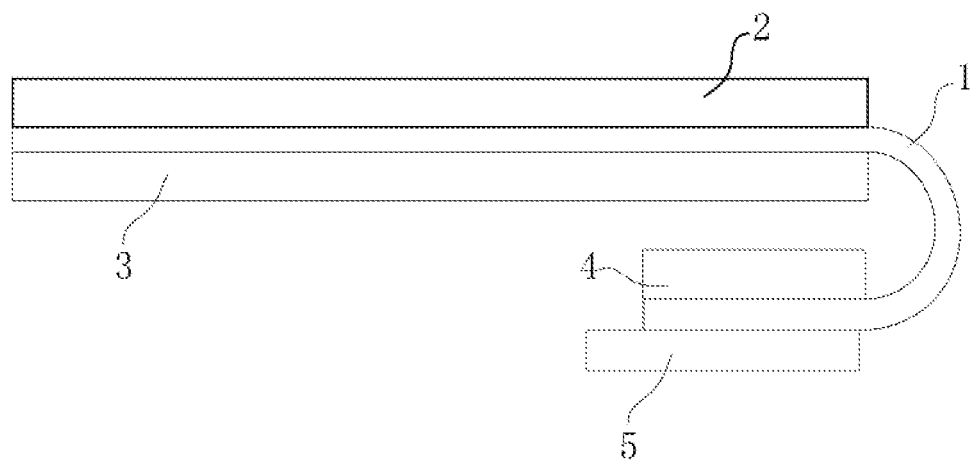
FIG. 7 is another schematic structural diagram of the flexible display substrate according to some embodiments of the disclosure after it is bent.

As illustrated in FIG. 1, FIG. 2, and FIG. 7, a flexible display substrate according to some embodiments of the disclosure includes: a flexible base substrate 4, and a trace layer 1 arranged on the flexible base substrate 4.

The trace layer 1 includes a first trace layer and a second trace layer, an insulating layer 12 is arranged between the first trace layer and the second trace layer, through-holes are arranged on the insulating layer 12, the first trace layer and the second trace layer are electrically connected with each other through the through-holes, the first trace layer includes a first trace 11, and the second trace layer includes a plurality of discrete connecting segments 13, i.e., the second trace 13.

In the flexible display substrate above, the first trace layer and the second trace layer are electrically connected with each other through the through-holes 14, so while the trace layer 1 is being bent, a bending stress on the trace layer 1 is spread onto the first trace 11 and the second trace 13, and furthermore the bending stress spread onto the first trace 11 and the second trace 13 can be spread into edge areas of the through-holes 14 through the through-holes 14 to thereby greatly spread the bending stress on the trace layer 1 so as to lower the risk that the trace layer 1 may be cracked or broken while being bent. Furthermore, the two traces of the trace layer 1 are connected with each other through the through-holes 14 so that there is a larger length of the trace layer 1 as a whole, and thus the trace layer 1 will be bent to a larger extent while being broken from the normal state thereof, to thereby facilitate elongation or constriction of the trace layer 1 while being bent and curved, so as to greatly lower the risk that the trace 1 may be cracked or broken while being bent. Furthermore, there are surface contacts among the through-holes 14, and the first trace 11 and the second trace 13, that is, there are a plurality of contact points between the first trace 11 and the through-holes 14, and between the second trace 13 and the through-holes 14, so even if the trace layer 1 is cracked or broken at any one contact point while being bent, the first trace 11 and the second trace 13 will be electrically connected with each other at other contact points, thus further lowering the risk that the trace layer 1 may be cracked or broken while being bent. Accordingly the risk that the trace layer 1 may be cracked or broken while being bent can be lowered in the flexible display substrate above to thereby improve the robustness of the flexible display substrate against bending and curving in operation so as to provide the flexible display substrate with a narrow bezel; the first trace 11 and the second trace 13 are connected with each other through the through-holes 14 to thereby lower both the impedance of the trace layer 1, and a joining impedance so as to reduce the size of a joining area, thus further narrowing the bezel of the flexible display substrate.

Furthermore, the trace is designed in the two layers connected with each other through the through-holes to thereby improve the flexibility of the trace layer 1 so as to improve the robustness of the flexible display substrate against bending, and the trace layer 1 with two trace can have a lower impedance to thereby facilitate a large-size touch layer to be folded in correspondence thereto.

In order to facilitate the structural form of the trace layer 1, as illustrated in FIG. 7, in an optional embodiment, a touch electrode layer 2 is arranged on the flexible display substrate 4, and a part of the touch electrode layer 2 is reused as the first trace layer.

In the flexible display substrate above, the first trace 11 is formed of metal in-plane pattern electrodes at the touch electrode layer 2 so that the first trace 11 can be formed conveniently, and a part of the touch electrode layer 2 is reused as the first trace 11 so that the function of the trace 1 can be performed at the same layer as a touch function to thereby simplify a fabrication process, and save materials.

In order to enable the first trace layer and the second trace layer to be electrically connected with each other through the through-holes 14, as illustrated in FIG. 1 and FIG. 7, optionally the insulating layer 12 is arranged on the side of the touch electrode layer 2 away from the flexible base substrate 4, the insulating layer 12 is made of a flexible material, and a wire layer is arranged on the insulating layer 12 as the second trace layer.

In the flexible display substrate above, the trace layer 1 includes the first trace 11 which is a reused part of the touch electrode layer 2, the insulating layer 12, the wire layer which is the second trace 13, and a protecting layer 15 successively, and the first trace 11 and the second trace 13 can be electrically connected with each other through the through-holes 14 on the insulating layer 12; and at this time, since the first trace 11 and the second trace 13 are arranged at different layers, the impedance of the trace layer 1 can be made lower, and a joining impedance can also be made lower to thereby reduce the size of a joining area so as to further narrow the bezel of the flexible display substrate.

Furthermore the, insulating layer 12 can be made of a flexible material including transparent organic polymer like acrylic acid resin, siloxane resin, polyimide, etc., or another organic material, or silicon oxide, silicon nitride or another inorganic material, and the material of the insulating layer 12 can be particularly selected as needed for the flexible display substrate.

Optionally, the wire layer can be a bridging conductor layer. In the flexible display substrate above, the second trace 13 can be routed at the bridging conductor layer in a bridge structure.

Optionally, the material of the wire layer is metal. In the bridging conductor layer above, a metal layer can be fabricated separately on the insulating layer 12 as the second trace 13, and at this time, the metal can be one or an alloy of molybdenum, aluminum, tungsten, titanium, and copper, although the embodiment of the disclosure will not be limited thereto.

In order to further lower the risk that the trace layer 1 may be cracked or broken, in an optional embodiment, the first trace 11 is a curved trace, and/or the second trace 13 is a curved trace.

In the flexible display substrate above, the trace is curved so that there is a larger length thereof than a straight trace in the related art, that is, the same bending stress is spread onto the longer trace so that there is a smaller bending stress spread onto each of the first trace 11 and the second trace so as to lower the risk that the trace layer 1 may be cracked or broken while being bent; and in order to accommodate the curved shaped of the trace layer 1 being bent, there is a larger bending stress on the curved trace layer 1 than on the straight trace layer 1, that is, a larger bending stress can be borne on the curved trace layer 1 so that the trace layer 1 will be bent to a larger extent while being broken from the normal state thereof, to thereby facilitate elongation or constriction of the trace layer 1 while being bent and curved, so as to greatly lower the risk that the trace layer 1 may be cracked or broken while being bent.

The first trace 11 and the second trace 13 can be structured in the following three forms.

In the first form, the first trace 11 is a curved trace, and the second trace 13 is a trace in another shape, where the curved first trace 11 can lower the risk that the trace layer 1 may be cracked or broken while being bent.

In the second form, the first trace 11 is a trace in another shape, and the second trace 13 is a curved trace, where the curved second trace 13 can lower the risk that the trace layer 1 may be cracked or broken while being bent.

In the third form, the first trace 11 is a curved trace, and the second trace 13 is a curved trace, where the first trace 11 and the second trace 13 may or may not be curved in the same shape.

Optionally, the curved trace can be a serpentine trace, or bent segments connected in sequence.

In the flexible display substrate above, the curved trace can be defined in a number of shapes, e.g., a serpentine shape, bent segments connected in sequence, arced segments connected in sequence, a combination of serpentine and bent segments, etc., although embodiments of the disclosure will not be limited thereto.

In order to further lower the risk that the trace layer 1 may be cracked or broken while being bent, in an optional embodiment, the number of through-holes 14 is N, where N>1.

In the flexible display substrate above, one or more through-holes 14 can be arranged, and the number of through-holes 14 can be selected as needed in reality for the flexible display substrate; and a plurality of through-holes 14 can be arranged to thereby make the trace layer 1, for sharing the bending force, longer so as to lower the risk that the trace layer 1 may be cracked or broken, and with the plurality of through-holes 14, there will be more contact points between the first trace 11 and the through-holes 14, and between the second trace 13 and the through-holes 14 so that even if the trace layer is cracked or broken at any one contact point while being bent, the first trace 11 and the second trace 13 will be electrically connected with each other at other contact points, thus further lowering the risk that the trace layer 1 may be cracked or broken.

Optionally, the shapes of the through-holes 14 can be one or a combination of a circle, a square, a diamond, and an ellipse.

In the flexible display substrate above, the shapes of the through-holes 14 can be one or more of a circle, a triangle, a square, a rectangle, a diamond, a trapezoid, a pentagram, a normal polygon, and any other regular or irregular shape, and the shapes of the through-holes 14 may or may not be the same shape, although embodiments of the disclosure will not be limited thereto.

Figure 3:
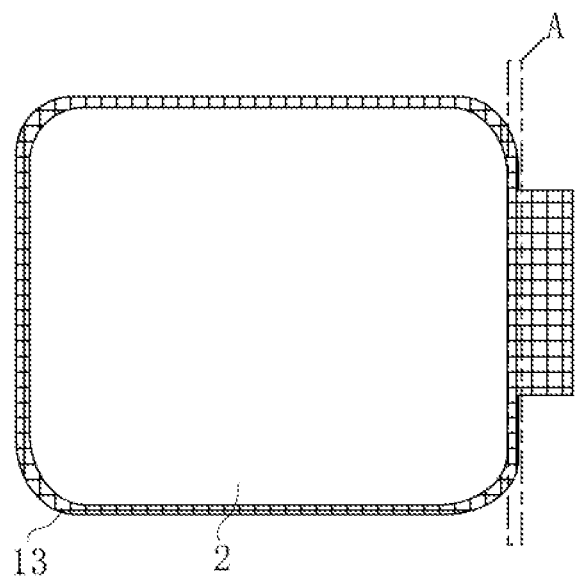
FIG. 3 is a schematic structural diagram of a flexible display substrate according to some embodiments of the disclosure.
Figure 4:
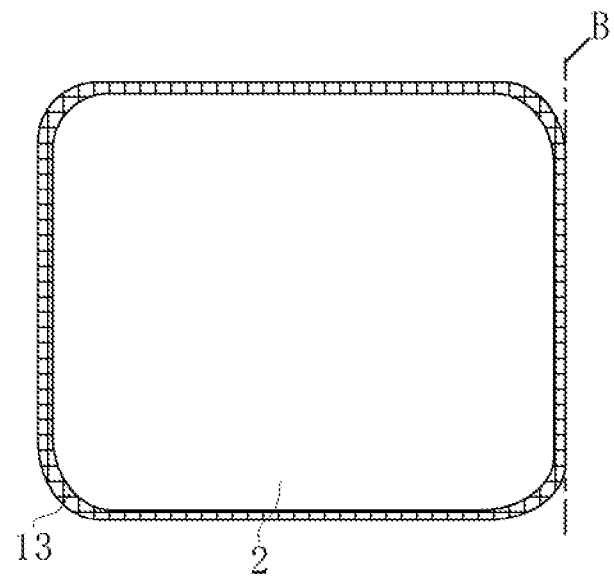
FIG. 4 is a schematic structural diagram of the flexible display substrate according to some embodiments of the disclosure after it is bent.
Figure 5:
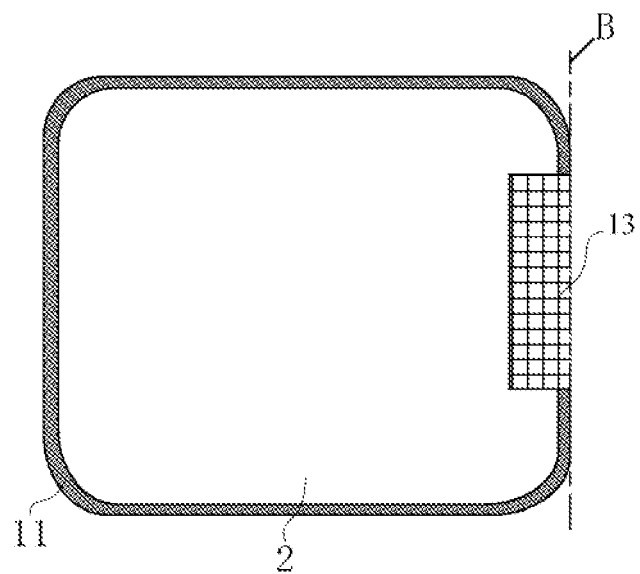
FIG. 5 is another schematic structural diagram of the flexible display substrate according to some embodiments of the disclosure after it is bent.

In an optional embodiment, as illustrated in FIG. 3, FIG. 4, and FIG. 5, the trace layer 1 is a trace with a fixed bending area.

Figure 6:
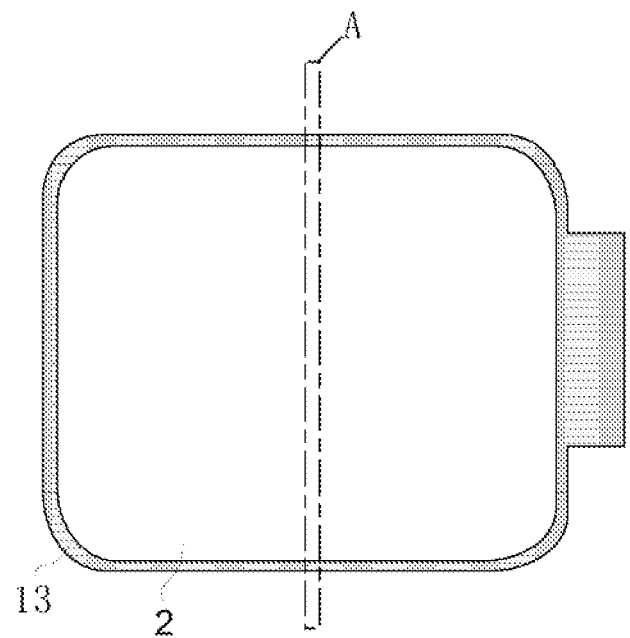
FIG. 6 is another schematic structural diagram of the flexible display substrate according to some embodiments of the disclosure.

In the flexible display substrate with a fixed bending position, the trace layer 1 may be only arranged in a bending area A as illustrated in FIG. 3, or the trace layer 1 may be arranged at the edges of all the touch electrodes; and the flexible display substrate can be bent around a bending axis represented as a straight line B so that the second trace 13 is bent onto one side of the first trace 11. As illustrated in FIG. 6, for a product to be folded or curved at will, the position of the bending area A can vary as needed for bending, and the trace layer 1 can be arranged as traces of all the touch electrodes. Furthermore, the design of the trace layer 1 can also be applicable if the bezel is to be narrowed, and the part of the trace layer 1 on the lower bezel is to be bent. As illustrated in FIG. 7, the trace layer 1 bound with a flexible printed circuit 5 is bent onto the side of the flexible base substrate 4 away from a backside film on the flexible electrode layer 2 so that the flexible printed circuit 5 can be arranged on the other side by bending the trace to thereby narrow in effect the bezel.

In an optional embodiment, the trace layer 1 can be one or a combination of a scan line, a data signal line, a clock signal line, and a touch signal line. In the flexible display substrate above, the trace layer 1 can alternatively be another trace known in the flexible display substrate, e.g., a common electrode signal line, although embodiments of the disclosure will not be limited thereto. Alike in a particular embodiment, in the flexible display substrate above according to the embodiment of the disclosure, the flexible display substrate can be an array substrate, an opposite substrate, or a touch substrate, although the embodiment of the disclosure will not be limited thereto.

It will be evident that those skilled in the art can make various modifications and variations to the disclosure without departing from the spirit and scope of the disclosure. Thus the disclosure is also intended to encompass these modifications and variations thereto so long as the modifications and variations come into the scope of the claims appended to the disclosure and their equivalents.

The invention claimed is:

1. A flexible display substrate, comprising: a flexible base substrate, a trace layer arranged on the flexible base substrate, and a protecting layer arranged on the trace layer, wherein:

the trace layer comprises a first trace layer and a second trace layer, an insulating layer is arranged between the first trace layer and the second trace layer, and the insulating layer is a single-layer film layer comprising through-holes;

the first trace layer comprises a first trace, the second trace layer comprises a plurality of second traces, the first trace are electrically connected with the plurality of second traces through the through-holes, the first trace completely overlaps with orthographic projections, on the first trace layer, of the plurality of second traces, and the plurality of second traces cover at least a portion of side walls of the through-holes;

a portion of the protecting layer is disposed in the through-holes, and a size of each of the through-holes in an extension direction of the first trace is smaller than a distance between two adjacent through-holes; and a touch electrode layer is arranged on the flexible display substrate, and a part of the touch electrode layer is reused as the first trace layer.

2. The flexible display substrate according to claim 1, wherein the insulating layer is arranged on a side of the touch electrode layer away from the flexible base substrate, the insulating layer is made of a flexible material, and a wire layer is arranged on the insulating layer as the second trace layer.

3. The flexible display substrate according to claim 2, wherein the wire layer is a bridging conductor layer.

4. The flexible display substrate according to claim 2, wherein the material of the wire layer is metal.

5. The flexible display substrate according to claim 1, wherein the trace layer comprises at least one of following structures: the first trace is a curved trace, and the second trace is a curved trace.

6. The flexible display substrate according to claim 5, wherein the first trace is a serpentine trace or bent segments connected in sequence, and/or the second trace is a serpentine trace or bent segments connected in sequence.

7. The flexible display substrate according to claim 1, wherein a shape of the through-holes is at least one of a circle, a square, a diamond, or an ellipse.

8. The flexible display substrate according to claim 1, wherein the trace layer is a trace with a fixed bending area.

9. The flexible display substrate according to claim 1, wherein the trace is at least one of a scan line, a data signal line, a clock signal line, or a touch signal line.

* * * * *